Nov. 15, 1938.　　　G. FLEISCHEL　　　2,136,971
VARIABLE SPEED MECHANISM
Filed Feb. 4, 1936　　　4 Sheets-Sheet 1
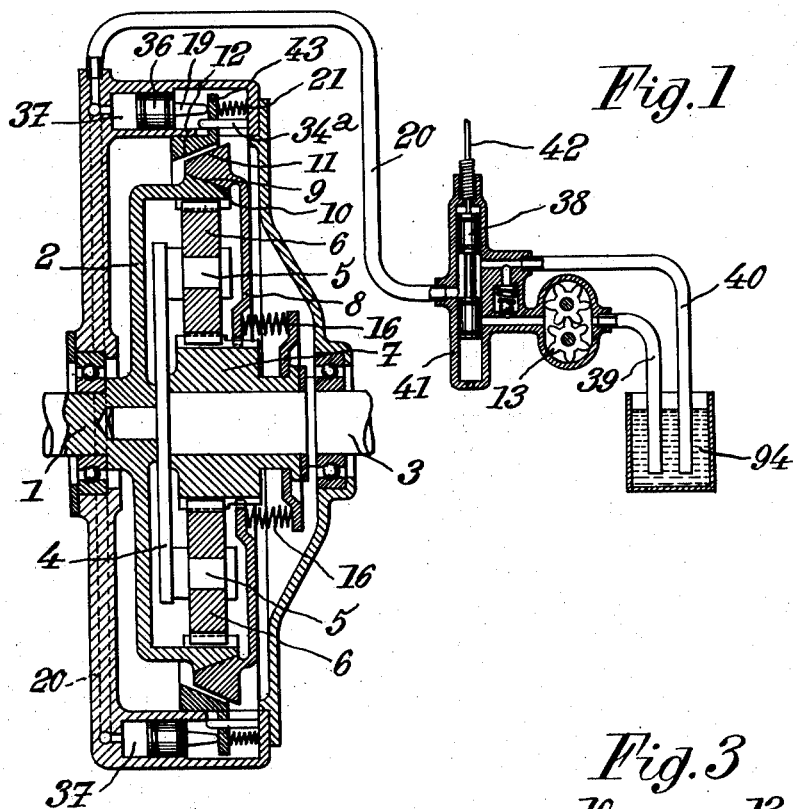
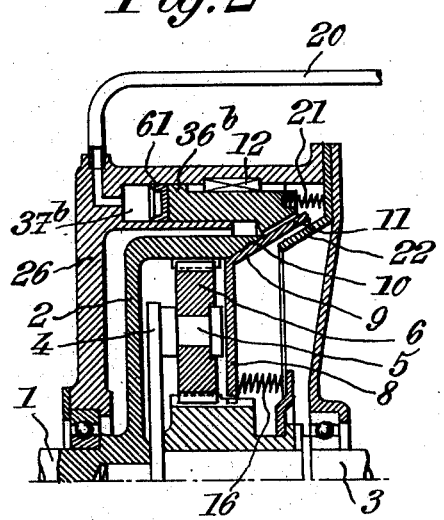
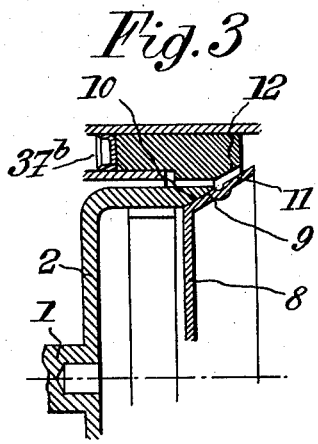
Inventor:
Gaston Fleischel
Attorneys:

Nov. 15, 1938.　　　　G. FLEISCHEL　　　　2,136,971
VARIABLE SPEED MECHANISM
Filed Feb. 4, 1936　　　　4 Sheets-Sheet 2
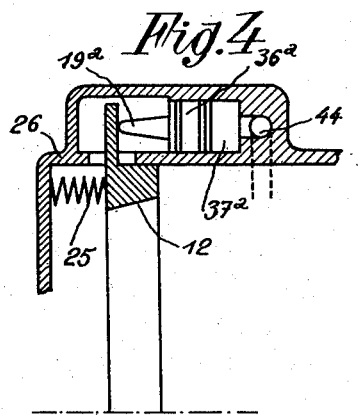
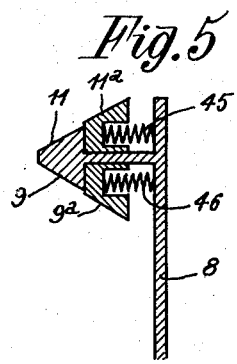
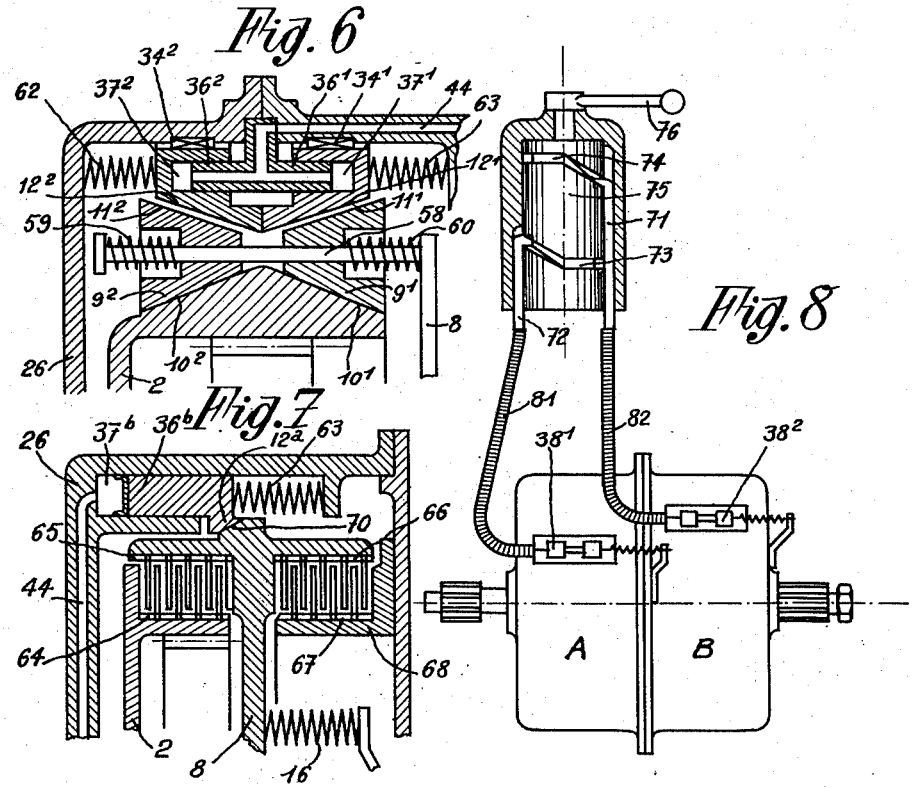
Inventor:
Gaston Fleischel
Attorneys:

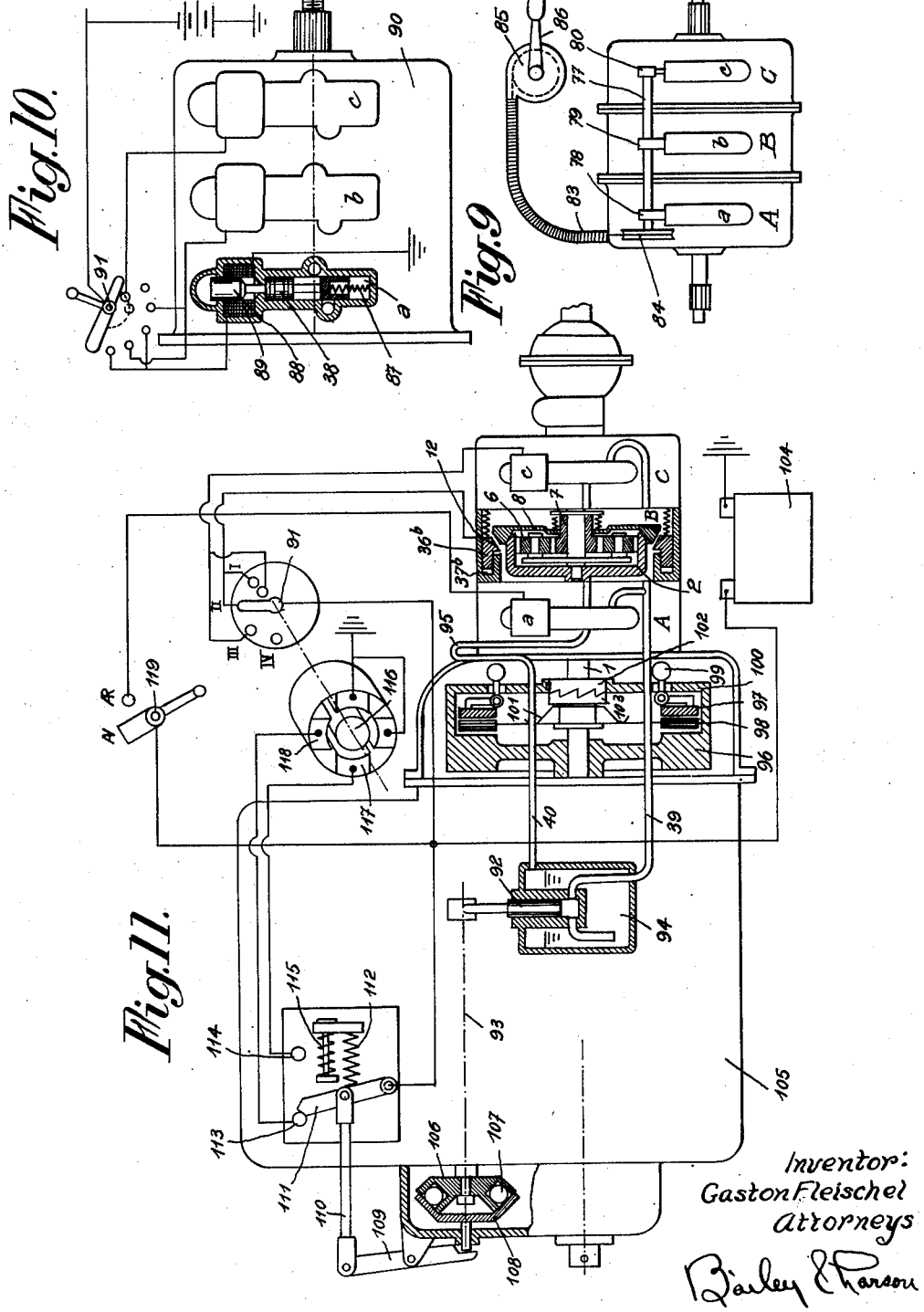

Nov. 15, 1938.   G. FLEISCHEL   2,136,971
VARIABLE SPEED MECHANISM
Filed Feb. 4, 1936   4 Sheets-Sheet 4
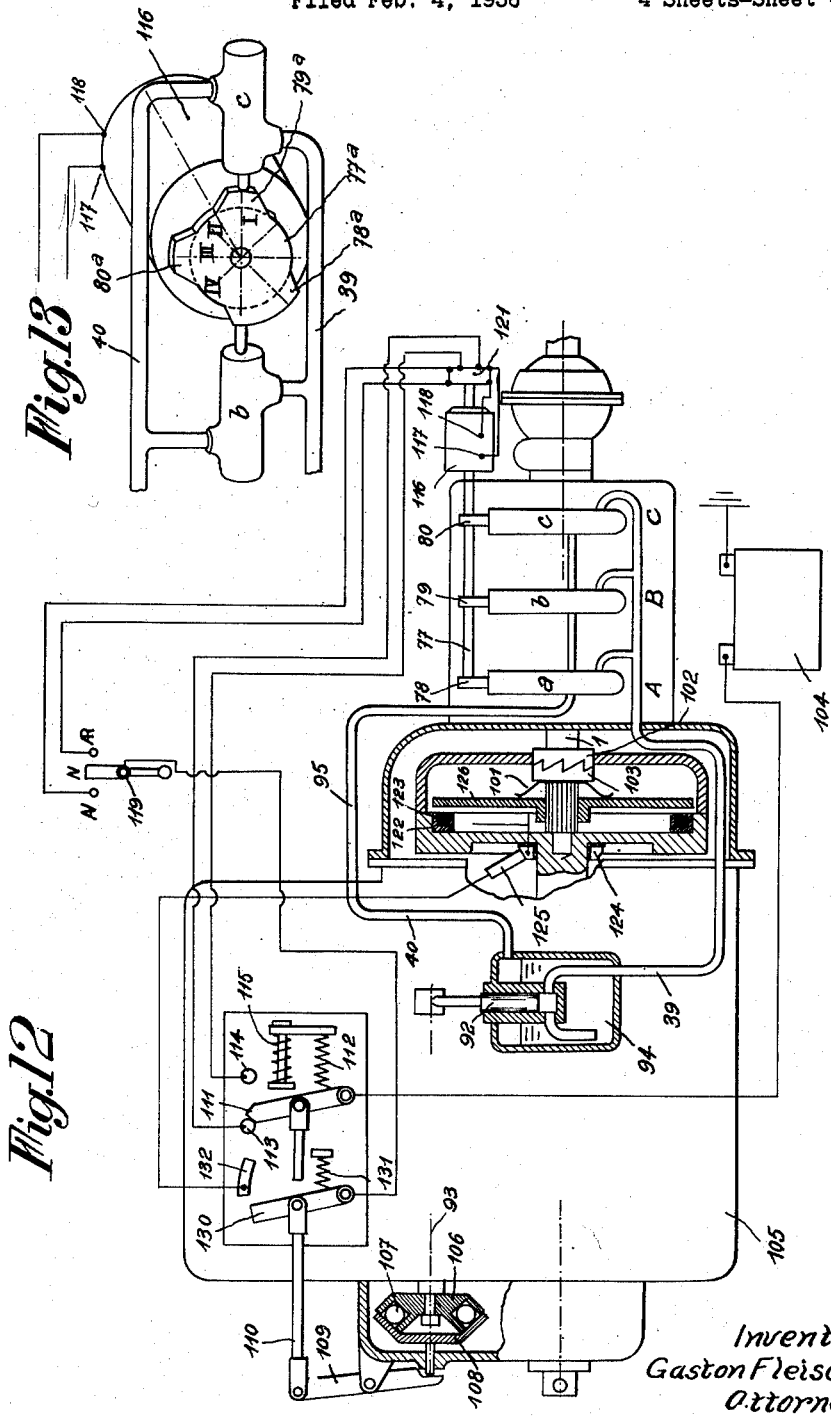
Inventor:
Gaston Fleischel
Attorneys:

Patented Nov. 15, 1938

2,136,971

UNITED STATES PATENT OFFICE 2,136,971

VARIABLE SPEED MECHANISM

Gaston Fleischel, Bleneau, France

Application February 4, 1936, Serial No. 62,382
In France December 9, 1935

6 Claims. (Cl. 74—260)

In the following description, I will call multiple speed and gradual engagement transmission any power transmission mechanism which, receiving on its input or driving shaft power from any engine in the form of a determined torque and velocity, delivers it on its output or driven shaft in the form of angular velocities and torques such that, at any given time, the ratio of these velocities to the angular velocity of the input shaft may be given a certain number of well determined values, the ratio of the torques being always in inverse ratio to the first mentioned ratio, and the passage from one gear ratio to another one taking place smoothly and gradually. The usual transmissions for automobile vehicles are of this type, at least when they are correctly operated.

The present invention relates more especially, although not exclusively, to a particular type of transmissions of this type which includes planetary gears combined with friction elements for controlling them, because, in this case, any skill and care requested from the driver may be eliminated. It follows that transmissions of this type can more easily be rendered automatic.

The active elements of these mechanisms may be divided into three groups more than one of each of which may be included in the mechanism.

One of these groups, which may be called input group or driving group, receives the motion from the engine and includes all the parts that rotate at the same speed as said engine.

Another group, which may be called output group or resisting group, is connected to the elements to be driven. It is this group which receives the power at a velocity and with a torque such that the ratios of their values with those corresponding to the input group can be given a certain number of predetermined values.

Finally, the third group, which may be called coupling group, serves to interconnect the two first mentioned groups and possesses the interesting property that the speed ratio between the driving group and the resisting group is determined by the conditions of operation of said third group. There are as many different speed ratios as there are different conditions of operation.

As a matter of fact, it is known that if the coupling group is connected to the input group or the output group through clutch means or the like, the whole of the mechanism forms a rigid unit and all the groups rotate at a speed equal to that of the input group (speed ratio equal to 1).

If, on the contrary, the coupling group is stopped (by braking for instance) the sun-wheels and planet-wheels are brought into play by reaction with this fixed part and impart to the output group a velocity different from that of the input group.

Finally, if the coupling group is left free to rotate, the mechanism becomes loose, that is to say is unable to transmit any power.

If, through various means, the coupling group can be caused to work under different conditions of velocity, a new gear ratio is obtained for each of them.

Of course, there already exist planetary systems which are still more complicated. But such systems either include several coupling groups, which are, so to speak, intermixed between the same driving group and the same driven group, or correspond to several trains disposed at the end of one another.

There exist several difficulties in the construction of these planetary systems. The chief of these difficulties lies in the control of the clutch means which, for the gear ratio equal to 1, must connect the coupling group, or a coupling group, to one of the two other groups. As a matter of fact, the clutch device requires an axial control with thrust bearings which are generally ball bearings since it is necessary to move with the minimum play pieces which may rotate at high speed and the construction of which is difficult or at least occupies a considerable space. Often, as a consequence of these difficulties, the volume and the weight of this clutch approximates those of the remainder of the gear box. For this reason, most of the planetary transmissions existing at the present time include a single clutch device and several brakes. But, as a consequence, they lose a certain number of the combinations which would be possible with a greater number of clutch mechanisms.

The object of the present invention is to provide mechanisms of the type above referred to which obviate these drawbacks. This will permit particularly advantageous combinations with known devices, thus considerably widening the field of these mechanisms.

An essential feature of the present invention consists in the fact that the clutch device or devices have no control means especially provided for them, their engagement or release being ensured through the suitable (nonrotating) control of the brakes included in the mechanism for immobilizing the coupling group.

Another essential feature of the invention is that the control of the clutch device results from the fact that the brake intended to immobilize the coupling group must, in order to reach the position in which it is fully applied, displace the friction surfaces of the clutch device, which surfaces, being permanently urged by any suitable device, for instance a spring, ensure the obtainment of a gear ratio equal to 1 for the system.

Inversely, the release of the brake again allows these clutch surfaces to produce the necessary friction.

An important feature, which results from the two first mentioned ones is that, as the contact of the friction surfaces of the brake takes place at the same time as contact is broken between the cooperating clutch surfaces, and inversely, there can be no interruption in the power transmission when changing from one gear ratio to another one.

Another important feature, which results from the preceding ones, is that, when the mechanism is in the state of rest, there is always a gear combination in function. This is an important advantage when the mechanism is fitted to an automobile vehicle because many automobile drivers consider that it is very important that the vehicle should be kept immovable when stopped by the action of the engine itself without the help of the brakes. If the mechanism includes one set of springs, the gear ratio which is in function when the vehicle is at rest is the highest one; with two sets of springs, this gear ratio is the lowest.

Another characteristic results from the fact that the brake of the planetary device is brought into action by an axial displacement, so that it can easily be actuated by small pistons operated by a fluid (liquid) under a pressure different from the atmospheric pressure, and any number of which, at least equal to three, is provided on the periphery of the brake, their axes being parallel to the axes of the main shafts of the gear box.

Another important feature, which results from the fact that the brake of the planetary device is brought into action by an axial movement, lies in the fact that its jaw itself can easily be arranged in such manner as to act as an annular surface servo-motor driven through any suitable power transmitting means, such for instance as a liquid under pressure.

Another important feature of the present invention consists in the provision of an automatic transmission by combining the transmission elements above described with automatic control devices such as described by me in prior patents.

Other features of the present invention will result from the following detailed description of some specific embodiments.

Preferred embodiments of the present invention will be hereinafter described, with reference to the accompanying drawings, given merely by way of example, and in which:

Fig. 1 is a longitudinal sectional view of a two speed gear box made according to the invention and including a servo-motor, for instance of the type operated by means of oil under pressure, including a plurality of pistons;

Fig. 2 is a similar view showing a portion of an analogous device corresponding to a modification, including for instance an annular servo-motor;

Fig. 3 is a similar view of another modification of a portion of the device shown by Fig. 1;

Fig. 4 is an axial sectional view of a control device, operable by hand or by means of a servo-motor, which corresponds to another use of the box;

Fig. 5 is an axial sectional view of an arrangement for rendering the action of the friction surfaces as gradual as possible;

Fig. 6 is a similar view of an embodiment in which all the axial thrusts are balanced;

Fig. 7 is a similar view illustrating the use of friction surfaces which are not conical;

Figs. 8, 9 and 10 show, in side view (partly in section) the control of a system including several two-speed boxes;

Fig. 11 is a diagrammatical view (partly in section) of a transmission which is wholly automatic made according to the invention;

Figs. 12 and 13 show modifications of the device shown in Fig. 11.

Fig. 1 diagrammatically shows a two-speed planetary change speed device made according to the invention and arranged to be controlled by means of a servo-motor;

The planetary gears are of a well known type.

The driving group includes the input shaft 1, connected to the engine, and the larger orbit-wheel 2, which is provided with internal teeth.

The resisting group includes the output shaft 3, which finally transmits the power from the engine, either modified or not by the gear box, and a carrier 4 including a certain number of axes such as 5 for planet wheels 6 meshing with the internal teeth of orbit-wheel 2.

The coupling group includes, on the one hand, the central sun-wheel 7, free to rotate on the output shaft, and meshing with the whole of the planet-wheels, and, on the other hand, the coupling elements which will be hereinafter described.

According to the invention, I provide, on sun-wheel 7, a plate 8 slidable with respect thereto but adapted to rotate together with it. In order to obtain this result, I may employ as sliding keys, the teeth themselves, which are given a sufficient length. This plate includes a rim, provided for instance with two conical surfaces (Fig. 1). The whole is arranged in such manner that the inner conical surface 9 can come into contact with a corresponding cone 10 carried by the driving orbit-wheel, while the outer conical surface 11 can come into contact with a cone 12 arranged in such manner that it can slide with respect to the casing of the device. For instance this cone 12 is provided with a flange 43 adapted to be moved longitudinally with respect to fixed fingers or pins 34a carried by said casing, whereby said cone 12 can slide axially with respect to the casing but cannot rotate with respect thereto.

I provide a series of springs 16, bearing against the hub of sun-wheel 7, so as to act on plate 8 with a sufficient strength for ensuring the drive of the resisting part (for instance an automobile vehicle) through the friction and adhesion between cones 9 and 10.

If such a gear box is left to itself, direct drive is always obtained, since the adhesion between cones 9 and 10 neutralizes all the internal elements and causes the whole of the mechanism to rotate as a single unit, therefore with the same angular velocity for all the parts.

In order to obtain the other velocity of the driven shaft lower than the velocity above mentioned, in the embodiment of Fig. 1, it is sufficient to move cone 12 rearward, not only in such manner that it adheres to cone 11, but a little further on in such manner that, by pushing plate 8 in front of its normal position, it moves cone 9 away from cone 10. This result is obtained through means including a servo-motor operated by oil under pressure, for instance a gear compressor 13 extracting oil from a tank 94 through a tube 39, the oil being returned through a tube 40. The compressor is driven by the engine of the vehicle or by the input shaft 1 of the gear box.

A distributing device 41, the slide valve 38 of which is controlled either manually or through automatic means 42, controls the feed of fluid under pressure through tube 20 into cylinders 37 the axes of which are parallel to the axes of shafts 1 and 3, said cylinders being evenly distributed over the periphery of the whole and their number being at least equal to three. In each of the cylinders there is slidably mounted a piston 36 carrying a finger 19 acting on the flange 43 of the braking member 12. The opposite face of said flange is subjected to the action of the return springs 21.

When pistons 36 are pushed to the end of their stroke, I obtain the lower gear ratio. When slide valve 38 allows oil to escape, by connecting cylinders 37 and tube 20 with tube 40, springs 16 and 21 bring element 12 back into the position corresponding to the higher gear ratio.

Fig. 2 shows a modification of this arrangement which is particularly advantageous when the efforts are to be considerable. Casing 26 is turned inwardly so as to form a chamber 37b having a flat bottom and concentric cylindrical walls. The rear part 36b of brake 12 is so shaped as to fill this chamber exactly, while being able to slide axially. I may also provide a fluidtight packing 61 between the two pieces. The oil under pressure fed through channel 20 is therefore allowed to push brake element 12 over a large surface, that of the bottom of piece 36b, rigid with brake element 12. I therefore obtain a simple arrangement, capable of transmitting considerable power.

Figs. 2 and 3 diagrammatically show two modifications of the arrangement of cones 10 rigid with the driving orbit-wheel 2, of cones 9 and 11, rigid with the coupling plate 8, and of cone 12, acting as a brake element. It can easily be ascertained that if, in any of the embodiments shown by these figures, brake cone 12 is moved rearward toward the right-hand side, clutch cones 9 and 10 are moved away from each other, while the contact between cones 11 and 12 is accentuated. I therefore obtain the same result as with the arrangement of Fig. 1, but without making use of opposed conical surfaces.

In order to obtain a gradual and finally tighter locking of plate 8 during the braking period, I may provide the casing with an annular flange 22 provided close to plate 8, but on the side thereof opposed to that on which brake 12 acts. With this arrangement, disclosed by Fig. 2, when brake element 12 is pushed back by the fluid under pressure, I first obtain a gradual contact between friction surfaces 12 and 11, together with a displacement of plate 8 until contact is established between plate 8 and stationary flange 22. At this time, plate 8 is tightly held between parts 12 and 22, just as between jaws. When the pressure ceases to act in cylinders 37 of Fig. 1, or in the annular chamber 37b of Fig. 2, springs 16 and 21 first push back the whole of plate 8 and brake element 12. When the plate has reached its extreme position, springs 16 become inactive and only springs 21 push back the brake element toward its released or disengaged position.

In some cases, it may be desired that, when the mechanism is left to itself, the lower gear ratio is brought into play. The immobilization of the vehicle at a standstill is then much stronger. It is sufficient, for this purpose, as shown by Fig. 4, after having disposed springs 21 against brake element 12, as in the preceding embodiments, to arrange pistons 36a in the opposite direction, in such manner that their action is exerted against that of springs 25.

It results from the above description that the change from one gear ratio to another gear ratio takes place without any interruption, since the frictional engagements are instantaneously replaced by each other, for each stroke of brake 12. However the gradual engagement of each gear combination is ensured by the slipping which takes place between the friction surfaces due to the differences of angular velocities until full adhesion is obtained.

It is possible to control this slipping action more fully through various means which ensure the gradual operation thereof. It is for instance possible to make cones consisting of several portions, as shown by Fig. 5 for the double cone 9—11 of the coupling train 8. For this purpose, I provide, for instance at the base of each of these cones, a groove in which are housed two auxiliary annular elements 9a and 11a respectively. These annular elements are of smaller width than the groove and they are pushed toward the apex by springs 45 and 46, which cause them to project from the conical surfaces 9 and 11. Adhesion is then limited to the suitable value in accordance with the strength of the springs 45 and 46, so that it is only after compression of these springs, due to the continuation of the movement that cones 9 and 11 come finally into contact with the surfaces that cooperate therewith. I thus obtain a gradual intermediate adhesion after which total adhesion is finally obtained, in the course of the axial displacement of brake element 12.

Of course, the cones ensuring the gradual adhesion might be carried by cones 10 and 12, instead of 9 and 11. And it is also obvious that I might make use of any other known device making it possible to obtain the same result.

All the devices described heretofore do not make it possible to balance the axial thrusts resulting from the provision of conical surfaces as friction surfaces. As a matter of fact, this is not necessary in most cases because ball bearings and roller bearings such as are made at the present time can withstand these thrusts when, as in the present case, they do not exceed certain limits.

However, it is possible to deduce from the mechanisms already described the steps to be taken for compensating the axial thrusts as shown by Fig. 6.

In a general way, it is possible to double the number of cones in such manner that each part is provided with two opposed cones. For instance, the driving orbit-wheel 2 is provided with two conical surfaces $10^1$ and $10^2$. The coupling plate 8 carries, for instance, through rods 58, two rings having each a double conical surface $9^1$—$11^{11}$ for one, $9^2$—$11^2$ for the other. These rings are urged toward each other by springs 59 and 60 playing the part of the springs 16 of Fig. 1.

The brake element consists of two rings provided on their internal sides with conical surfaces $12^1$ and $12^2$, the external surfaces of said rings being cylindrical and maintained in casing 26 by sliding keys $34^1$ and $34^2$.

If the system is left to itself, springs 62 and 63 bring brake elements 12¹ and 12² quite close to each other, thus preventing them from coming into contact with conical surfaces 11¹ and 11². These surfaces, urged by springs 59 and 60 are applied against cones 10¹ and 10² of the driving orbit-wheel 2. This corresponds to the higher gear ratio and the thrusts exerted on driving orbit-wheel 2 balance one another.

In order to make it possible to operate brake elements 12¹ and 12², said elements are hollowed out so as to form two chambers 37¹ and 37² analogous to chamber 37b of the embodiment of Fig. 2 and I insert in these chambers a piece having the shape of a body of revolution, for instance generated by the rotation of an inverted T about the axis of the box in such manner that its projecting circular parts 36¹ and 36² close chambers 37¹ and 37². By sending oil under pressure into conduit 44, I move the jaws of the brake away from each other against the action of the springs and I obtain the lower gear ratio. If the oil under pressure is evacuated, the jaws of the brake are allowed to move toward each other and the higher gear ratio is again obtained.

At lower speed, the thrusts exerted on plate 8 balance one another.

In the preceding explanations, I have always been referring to friction cones. This does not mean that it is the only shape of surface of friction that might be employed. Any other system of frictional connection may quite as well be considered, provided that it is operated by imparting an axial movement thereto.

Fig. 7 is an example of such an arrangement. In this case, I provide, between coupling plate 8 and driving orbit-wheel 2, a multiple disc clutch, the even-numbered discs being for instance connected to the driving orbit-wheel in rotation while being axially slidable with respect thereto, owing to the provision of a key 64, and the odd-numbered discs being connected in a similar manner to plate 8 owing to the provision of a key 65.

On the other side of plate 8, there is provided a similar device, the odd-numbered discs being, for instance, connected to plate 8 through key 66 and the even-numbered discs being connected, through a key 67, to a stationary piece 68 of circular shape fixed to the casing. By themselves, all the discs are mounted with a certain freedom so that there is no drive. But springs 16, mounted as above explained, apply the multiple friction between orbit-wheel 2 and plate 8, which is thus driven, bringing into play the higher speed.

In order to apply the brake, I may employ, for instance, a device already described with reference to Fig. 2. If there is no oil under pressure in annular chamber 37b, springs 63 bring annular piece 36b out of the way and the higher speed is still obtained.

But if oil under pressure is fed to chamber 37b, the action of springs 16 is neutralized and the oil pressure tightly holds, between springs 63 and 16, the multiple disc brake, which stops plate 8 and brings into play the lower gear.

The fact that the projection 12a of piece 36b which is not to turn comes into contact with a projection 70 of rotary plate 8 has no detrimental effect since immediately after this plate stops under the action of the brake. These parts in contact may advantageously be of conical shape in order to participate in the braking action as soon as they are in contact together, which improves the gradual working. The arrangement is then somewhat analogous to that shown by Fig. 5.

Heretofore, I have considered only the case of two-speed boxes and their elementary mechanisms. But the devices above described might be employed for obtaining more than two speeds, for instance through the well known method which consists in coupling together two two-speed gear boxes so as to obtain four speeds, or three two-speed boxes so as to obtain six or eight gear ratios, etc. Of course, in this case, the ratios of these boxes are chosen of different values, otherwise the number of gear ratios finally obtained would be reduced.

There exists no special difficulty in the assembly of gear boxes of this kind one behind the other. It is sufficient to connect the output shaft of one with the input shaft of the other, or preferably to make these shafts into a single piece.

On the contrary, the control means must be devised in such manner as to control the different gear boxes, for instance, through a single operating element. It is not possible, for the control of complex boxes to make use of the manual control, which already gives poor results in the case of two speed gear boxes. In the present case, I will always make use of a servo-motor.

It has been shown, with reference to Fig. 2, that, in this case, the operating element is a mere distribution slide valve which serves to control the feed or the exhaust of oil under pressure, as shown at 38. As this slide valve or the like can be built in such manner that it is balanced, its operation merely requires a very small effort.

If there are only two gear boxes to be controlled, I advantageously employ the device shown in Fig. 8, which shows a means for operating slide-valves 38¹ and 38², belonging respectively to two gear boxes A and B disposed at the end of each other, these two gear boxes being made according to one of the embodiments above described.

For this purpose, I may have recourse to two flexible controls 81 and 82 similar to the control 42 shown in Fig. 1. These flexible connections are provided at their ends with two flexible rods 71 and 72, the curved upper ends of which engage in grooves 73 and 74, of suitable shape, provided in cylinder 75. The latter is angularly connected with a handle 76, which may be turned by the driver through a certain angle for passing from one gear ratio to the next one. The law of the displacements of slide valves 38¹ and 38² for obtaining the various ratios determines the shape to be given to grooves 73 and 74.

I may also make use of the device shown by Fig. 9 for the control for instance, of three gear boxes A, B and C disposed one behind the other. In this case I arrange the slide valves vertically and I provide them with return springs urging them upwardly. In the drawing, the slide valves are designated by reference characters *a*, *b* and *c*, respectively. Above them, and arranged in such manner as to come into contact with their upper ends, I provide a cam-shaft 77 provided with cams 78, 79 and 80, each of these cams being disposed in such manner and being given an outline such that the rotation of the shaft produces the desired gear ratios of the gear boxes, associated in their natural order in the course of the rotation of said shaft.

A flexible shaft, extending in guiding means constituted by a flexible tube or sheath 83, is wound at its lower end around a pulley 84 rigidly connected to shaft 77, and at its upper end around a pulley 85 rigid with handle 86. In this way, the rotation of the pulley in one directiton produces the rotation of cam-shaft 77. In the opposite direction, a spring, for instance a coil spring (not shown) mounted on said shaft produces the rotation, by ensuring the tension of the cable in such manner that this control arrangement gives the same results as a positive control. Notches may also be provided for locking lever 86 in position.

I may also, as shown by Fig. 10, electrically control any number of distributing devices and therefore of elementary boxes. For this purpose, I provide each distributing device, such as 38, with a return spring 87, at its lower end for instance, and with an electromagnetic attracting device at its lower end. When the coil 89 of this electromagnetic device is not fed with current, the spring brings, for instance, the distributing device into the position which corresponds to the evacuation of oil. But if coil 89 is fed with current, its core 88 is attracted, pushing the distributing device before it and compressing spring 87. The distributing device is brought into the position which corresponds to the feed of oil.

I may thus control all the distributing devices provided in a gear box having as many gear ratios as it is necessary and enclosed in a casing such as 90, merely through an electric switch 91, connected, for instance, to the battery of the vehicle. The law of the speed changes determines the connections to be associated with the respective contact studs which must be fed with current for each of the positions of switch 91, in order that the different gears may be obtained successively in their normal order.

The property of the planetary box above described according to which there is no interruption in the power transmission, even when changing from one gear combination to another combination, makes it possible to utilize it very advantageously for providing an automatic transmission.

But of course it is necessary that the properties of the elements to be associated with this box should not be in opposition with these advantages and should not neutralize them.

As the engines used in connection with automobile vehicles or the like cannot be stopped every time the vehicle stops, it is necessary to associate with the gear box a clutch of any suitable type since the gear box according to the invention does not make it possible, in contrast to the usual gear boxes, to disconnect the engine from the remainder of the vehicle.

But it would be illogical, since it would destroy some of the most interesting properties of the box itself, to associate with this box the operation of which requires from the driver no effort whatever, because of the provision of the oil servomotor, any clutch device which would not be provided with control means of the same kind.

There exist already clutch devices the operation of which may be effected in either of the following manners:

a. With very reduced efforts. This is the case of electromagnetic clutches, which are controlled through a mere switch or the like which, when closed, feeds current to their coil, which produces the driving engagement, and when opened, interrupts this drive.

b. Without any effort whatever. This is the case of centrifugal clutches with solid or fluid masses, in which the centrifugal force produces the drive as soon as the velocity exceeds a predetermined value, or interrupts it below this value, for instance by bringing frictional surfaces together or away from one another, in the case of solid masses.

However, if applied without certain precautions, either of these solutions would destroy an essential property of the gear box, to wit the fact that the vehicle is locked by the engine when stopped.

This locking action is made impossible by the presence of a centrifugal clutch, which is of course disengaged when the engine is stopped. On the other hand, the consumption of current in an electromagnetic clutch cannot be maintained for an indetermined period of time when the vehicle is stopped merely to exert this locking action, because the battery of the vehicle would soon be discharged. Both kinds of clutches must therefore be adapted to the present case.

Now there exist devices, called "free wheel" devices, capable of establishing a connection between two shafts for one direction of rotation while there is no connection for the other direction of rotation.

If such a free wheel device is fitted between two parts of the clutch that is considered, being arranged in such manner that the drive is cut off when the engine rotates at a higher speed than the transmission and reestablished in the opposite direction, the vehicle is not driven when the clutch is disengaged (the engine being able to rotate at a higher speed than the transmission).

But, on the other hand, the vehicle is locked by the engine when it is stopped because, although the clutch is then released, the free wheel device prevents the vehicle from starting due to the resistance of the engine, since the gear box is always in engagement. With this arrangement, I therefore keep the important property of locking the vehicle at standstill by means of the engine.

It is unnecessary to give a special drawing showing the semi-automatic transmission which can thus be established, because not only are the elements added to the systems already disclosed of a well known type and their location the same as that which is usual in the construction of automobile vehicles, but also the figures of the present specification which show wholly automatic solutions as will be hereinafter described include all the elements of the semi-automatic solution.

Fig. 11 shows a wholly automatic solution made according to the principles above stated and derived from the construction disclosed by Fig. 10.

The gear box proper includes three two-speed gear boxes made according to the present invention. The first box A supplies for instance forward drive and reverse gear. Its direct drive is in the forward direction and the planetary gears are arranged in such manner that for the lower speed, the direction of rotation is reversed.

The two other boxes are devised, for instance, in such manner as to give four gear ratios as above explained. They include, for instance, gears and a servo-motor of the kind shown in Fig. 1, any other combinations being possible in the same manner. Only box B is shown in section.

Distributing devices a, b (not visible since box B is shown in section) and c, which control these boxes, are provided with electro-magnets as shown in Fig. 10.

Oil under pressure is fed to the distributing devices by a pump, having for instance a plunger piston 92 which may be actuated by the cam-shaft of the engine diagrammatically shown at 93, said oil being fed from a tank 94 and sent into conduit 39 under pressure, which, through suitable branches, conveys it to distributing devices a, b and c. The escape of oil takes place through tube 40 through which the oil expanded when issuing from the distributing devices is brought back to tank 94.

Attention is called to the upper bend 95 of this conduit, which serves to prevent oil from flowing from the servo-motors at the time of the exhaust. As a matter of fact, said exhaust is intended to reduce the oil pressure but not to empty the conduits, in order both to prevent air from leaking in and to avoid the loss of time that would result from the necessity of filling the conduits with oil for the next operation.

The centrifugal clutch is of a well known type and it is shown in a diagrammatical manner. The fly-wheel 96 of the engine drives a disc 97 which turns therewith but can slide with respect thereto. This disc is normally held apart from fly-wheel 96 by springs not shown on the drawings.

Between fly-wheel 96 and disc 97 there is provided a disc 98 lined with a matter which can well withstand friction, said disc being rigid with the input shaft of the first gear box (for instance reversing gear A). Eccentric masses 99 are carried by a plate 100 rigid with the fly-wheel. The centrifugal force which acts thereon when the rotation takes place is transferred to disc 97 which, by holding disc 98 between itself and the fly-wheel, causes the vehicle to be driven.

The free-wheel device is provided between plate 100, rigid with the fly-wheel and therefore with the engine, and shaft 1. This free wheel device is diagrammatically represented by two ratchet wheels, held against each other, for instance by a flat spring 101. One of these wheels 102 is rigid with fly-wheel 96 through the medium of plate 100 and the other one is rigid with shaft 1.

As a matter of fast, less rudimentary mechanisms would be used for practical purposes, for instance of one of the types including balls, rollers or spiral springs as are used at the present time.

The free wheel is arranged in such manner that the engine cannot drive shaft 1, but, on the contrary, said shaft, when revolving, drives said engine as above explained.

If this system is further provided with an electric switch such as 91, fed with current from the battery 104 of the vehicle, the semi-automatic transmission above referred to is obtained.

In order to render this transmission wholly automatic, it is sufficient to complete it with any of the various means described by me in my prior patents, In order to render the whole easily understandable, I will now briefly describe one of the controls, chosen at random.

On any shaft participating in the movement of engine 105, for instance camshaft 93, there is fitted a centrifugal governor, consisting for instance of a cage 106 containing balls 107 the housings of which are inclined with respect to the axis of revolution.

A sliding cone 108 is subjected to the thrust of the balls and transmits it, for instance, to a lever 109 and a connecting rod 110 acting on a lever 111 which is insulated from the metallic mass of the vehicle and receives electric current, for instance from batery 104.

In the state of rest, this lever is applied by a spring 112 against a contact stud 113. When the engine gathers speed and reaches a certain speed of revolution $v$, the centrifugal governor compels lever 111 to leave this contact 113. But, in the course of its motion toward the other contact 114, said lever comes into contact with a spring stop 115 and it is necessary that the centrifugal force should become much stronger and therefore that the speed of revolution of the engine should reach a much higher value V for allowing lever 111 to close the circuit by coming onto contact 114. The values of $v$ and V are chosen to correspond to the values for which it is desired that the gear ratios should be automatically changed, in the upward and downward directions, respectively.

In order not to increase the length of the description, I do not mention here the means for varying the values $v$ and V, although these means are shown in my prior patents above referred to.

Contacts 113 and 114, when one of them is reached by lever 111, send the current of the battery to a small electric servo-motor 116, which is intended to drive switch 91, so as to operate it instead of the driver of the vehicle, respectively through inductor systems 117 and 118, independent of each other, which cause the motor and the switch to turn one in a direction corresponding to an increase of the gear ratio, and the other in the direction corresponding to a reduction of the gear ratio. Thus I obtain a change to a lower gear when contact 113 is closed, and to a higher gear when contact 114 is fed with current.

The speed reversing gear A is not automatically controlled because only the driver of the vehicle can decide when the direction of running of the vehicle is to be reversed. A switch 119, placed within reach of the driver, does not feed current to the electro-magnet of gear A when it is set in the position corresponding to forward drive, so that distributing device a, pushed by its springs, produces the direct drive, that is to say the working in the forward direction.

If, on the contrary, the driver brings switch 119 into the position AR, correspoding to reverse gear the electric current is fed to the electromagnet which controls the distributing device, so that oil is fed under pressure to the servo-motor of box A and brings into play the speed reversing gear.

Fig. 12 shows another embodiment of a wholly automatic transmission, derived from the camshaft device shown in Fig. 10 and associated with an electromagnetic clutch.

In this case also it is assumed that the gear box consists of three elements A, B and C, one of these elements, for instance A, being a speed reversing gear, while the other two, to wit B and C, each give four gear combinations. These three elements are respectively controlled by three distributing devices a, b and c, actuated by shaft 77 through cams such as 78, 79 and 80. But, in this embodiment, the camshaft is directly driven by an electric motor 116 including, as in the preceding example, inductor windings 117 and 118 which permit the system including lever 111 and contacts 113 and 114, associated with springs 112 and 115 (the whole having been already described with reference to Fig. 11) to cause the serve-motor to turn either in one direction or in the opposite one, according to the magnitude of the centrifugal force supplied by ball governor 106—107, the cone 108 of which is movable under the action of balls 107.

But, in the present embodiment, an electric distributor 121, which turns together with camshaft 77, brings servo-motor 116 under the control of the automatic elements only for passing from working speed I, II, III or IV to another of these speeds. For passing into reverse gear, into neutral gear or into first gear, the servo-motor is brought by this rotary distributor into a position in which it can be controlled only by operating handle 119, whereby the driver only can effect these operations. It is only afterwards that the automatic elements are brought into action, but only for the four combinations of elements B and C.

The device operated by oil under pressure is the same as for Fig. 11.

Therefore, in this embodiment, the clutch is of the electro-magnetic type. It includes an annular element 122 made of magnetic steel, fixed, for instance to the fly-wheel of the engine and in which is placed a winding 123 which may be fed with current, under certain circumstances, by a rotary collector 124, upon which a brush 125 is applied. When current is fed to winding 123, element 122 can attract an armature 126, rigid with the input shaft 1 of the gear box, whereby the latter is then driven by the engine.

A clutch of this kind might be controlled by a hand switch adapted to be operated by the driver. But in this case, the control of the clutch would be only semi-automatic while the control described for the gear box proper is wholly automatic.

I may easily arrange the whole in such manner that it works in a wholly automatic manner, by providing between the centrifugal governor and the automatic control device 111 of the gear box a circuit-breaker consisting of a lever 130, electrically insulated from the metallic mass of the vehicle and operatively connected with the governor through a rod 110, whereas it is pushed back by spring 131, in such manner that, as long as the speed of revolution of the engine has not reached a certain value (chosen for the letting in of the clutch) lever 130 cannot reach contact 132. But, beyond this speed, the lever overcomes the resistance of spring 131 and, coming into contact with contact 132, it permits current from the battery to reach coil 122, which causes the vehicle to be driven.

Thus, with this arrangement, I have, through wholly different means, obtained the same working as with the automatic arrangement of Fig. 11.

Fig. 13 shows an interesting modification of the cam arrangement already disclosed by Fig. 12.

Cams 78a, 79a and 80a are arranged at the periphery of a disc 77a which is fixed to the end of the shaft of the electric servo-motor 116 including two inductor systems 117 and 118 as above explained. This disc plays exactly the same part as camshaft 77, with respect to the distributing devices b and c of boxes B and C of Fig. 12. These distributing devices are, for instance, disposed along a diameter of the disc. The working of the device is obvious. The disc carries inscriptions which, when they are brought by the electric motor opposite distributing device c or any other fixed point, indicate the gear combination that is in operation as a result of the position given to distributors b and c by the cams.

The speed reversing gear A, the working of which occurs less frequently, is supposed, in this embodiment, to be also operated through the medium of oil under pressure, its distributing device a being controlled, for instance, by the driver through flexible connecting means.

In a general way, while I have, in the above description, disclosed what I deem to be practical and efficient embodiments of the present invention, it should be well understood that I do not wish to be limited thereto as there might be changes made in the arrangement, disposition and form of the parts without departing from the principle of the present invention as comprehended within the scope of the accompanying claims.

What I claim is:

1. A change speed gearing of the two-stage planetary type between driving and driven shafts, comprising a cycloidal train having three groups of elements, one connected to the driving shaft and one connected to the driven shaft, a non-rotatable axially movable control member, means controlled by axial displacement of said control member in one direction to establish a frictional connection between one of said shafts and one of the groups of the planetary system not connected to said shaft for direct drive, and means controlled by axial displacement of said control member in the other direction for frictionally engaging one of said groups to immobilize the same so that the drive takes place at a reduced speed, one of said means engaging before the other means releases and vice versa, and a servo-motor connected to said control member to displace the same.

2. A change speed gearing of the two-stage planetary type between driving and driven shafts comprising a cycloidal train having three groups of elements, one connected to the driving shaft and one to the driven shaft, a non-rotatable axially movable control member having a friction surface, a member connected to one of the groups and having two friction surfaces one cooperating with the friction surface of said control member, a member connected to another of said groups and having a friction surface cooperating with the second friction surface of said first member, whereby in one position of said control member said last two members are frictionally engaged for direct drive, while in another position of said control member said last two members are moved out of engagement while said control member engages and immobilizes the first of said last two members to obtain a drive at reduced speed, said control member engaging the cooperating friction surface, before the cooperating friction surfaces of said last two members are disengaged, and vice versa, and a servo-motor connected to said control member to displace the same.

3. In a device as claimed in claim 2, spring means urging said last two members together.

4. In a device as claimed in claim 2, spring means urging said last two members together, and spring means urging said control member out of engagement with the first of said last two members.

5. A change speed gearing of the two-stage planetary type between driving and driven shafts comprising a cycloidal train having three groups of elements, one connected to the driving shaft and one to the driven shaft, a non-rotatable axially movable control ring having a conical friction surface, a member connected to one of the groups and having two conical friction surfaces one cooperating with the friction surface of said control ring, a member connected to another of said groups and having a conical friction surface cooperating with the second friction surface of said first member, whereby in one position of said control ring said last two members are frictionally engaged for direct drive, while in another position of said control ring said last two members are moved out of engagement while said control ring engages and immobilizes the first of said last two members to obtain a drive at reduced speed, said control ring engaging the cooperating friction surface before the cooperating friction surfaces of said last two members are disengaged, and vice versa, and a servo-motor connected to said control ring to displace the same.

6. A change speed gearing of the two-stage planetary type between driving and driven shafts comprising a cycloidal train having three groups of elements including a ring gear connected to one of the shafts and a planet carrier connected to the other shaft, and a sun gear, a non-rotatable axially movable control member having a friction surface, a member connected to the sun gear and having two friction surfaces one cooperating with the friction surface of said control member, a member connected to the ring gear and having a friction surface cooperating with the second friction surface of said first member, whereby in one position of said control member said last two members are frictionally engaged for direct drive, while in another position of said control member said last two members are moved out of engagement while said control member immobilizes the first of said last two members to obtain a drive at reduced speed, said control member engaging the cooperating friction surface, before the cooperating friction surfaces of said last two members are disengaged, and vice versa, and a servo-motor connected to said control member to displace the same.

GASTON FLEISCHEL.